(12) United States Patent
Andrade Costa et al.

(10) Patent No.: US 10,073,739 B2
(45) Date of Patent: *Sep. 11, 2018

(54) METHODS, APPARATUS AND SYSTEM FOR SELECTIVE DUPLICATION OF SUBTASKS

(71) Applicant: International Business Machines Corporation, Armonk, NY (US)

(72) Inventors: Carlos H. Andrade Costa, White Plains, NY (US); Chen-Yong Cher, Port Chester, NY (US); Yoonho Park, Chappaqua, NY (US); Bryan S. Rosenburg, Cortlandt Manor, NY (US); Kyung D. Ryu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/957,584

(22) Filed: Dec. 2, 2015

(65) Prior Publication Data

US 2016/0085640 A1 Mar. 24, 2016

Related U.S. Application Data

(63) Continuation of application No. 14/176,083, filed on Feb. 8, 2014, now Pat. No. 9,298,553.

(51) Int. Cl.
*G06F 11/00* (2006.01)
*G06F 11/14* (2006.01)
(Continued)

(52) U.S. Cl.
CPC ........ *G06F 11/1415* (2013.01); *G06F 11/008* (2013.01); *G06F 11/0754* (2013.01);
(Continued)

(58) Field of Classification Search
CPC .............. G06F 11/004; G06F 11/0709; G06F 11/0754; G06F 11/0757; G06F 11/076;
(Continued)

(56) References Cited

U.S. PATENT DOCUMENTS 5,805,785 A 9/1998 Dias et al.
6,446,218 B1 9/2002 D'Souza
(Continued)

OTHER PUBLICATIONS

IBM, "Streamlined processes for generating IMS Sub-systems with large resource configurations," IP.com Prior Art Database Technical Disclosure, IP.com No. IPCOM/000188582D, Oct. 2009, pp. 1-6.
John McDermott, "R1: A Rule-Based Configurer of Computer Systems," IP.com Prior Art Database Technical Disclosure, Software Patent Institute, Apr. 1980, pp. 1-57.
(Continued)

*Primary Examiner* — Gabriel Chu
(74) *Attorney, Agent, or Firm* — Daniel P. Morris, Esq.; Otterstedt, Ellenbogen & Kammer, LLP

(57) ABSTRACT

A method for selective duplication of subtasks in a high-performance computing system includes: monitoring a health status of one or more nodes in a high-performance computing system, where one or more subtasks of a parallel task execute on the one or more nodes; identifying one or more nodes as having a likelihood of failure which exceeds a first prescribed threshold; selectively duplicating the one or more subtasks that execute on the one or more nodes having a likelihood of failure which exceeds the first prescribed threshold; and notifying a messaging library that one or more subtasks were duplicated.

17 Claims, 4 Drawing Sheets

(51) Int. Cl.
  *G06F 11/07* (2006.01)
  *G06F 11/20* (2006.01)
  *H04L 29/08* (2006.01)
  *G06F 11/30* (2006.01)
  *G06F 11/34* (2006.01)

(52) U.S. Cl.
  CPC ...... *G06F 11/1482* (2013.01); *G06F 11/1492* (2013.01); *G06F 11/203* (2013.01); *G06F 11/302* (2013.01); *G06F 11/3409* (2013.01); *H04L 67/1034* (2013.01); *G06F 11/2023* (2013.01); *G06F 11/2048* (2013.01)

(58) Field of Classification Search
  CPC .. G06F 11/0793; G06F 11/14; G06F 11/1482; G06F 11/16; G06F 11/20; G06F 11/202; G06F 11/2023; G06F 11/2025; G06F 11/2028; G06F 11/203; G06F 11/24; G06F 11/3006; G06F 11/3055; G06F 11/3058; G06F 11/3404; G06F 11/3433; G06F 2201/81; G06F 9/3891; G06F 9/465; G06F 9/505; G06F 9/5083; G06F 9/5088; G06F 9/5094; H04L 67/1008; H04L 67/1029; H04L 67/1034
  See application file for complete search history.

(56) References Cited

U.S. PATENT DOCUMENTS

| | | |
|---|---|---|
| 6,735,717 B1 | 5/2004 | Rostowfske et al. |
| 7,321,992 B1 | 1/2008 | Vellore et al. |
| 2005/0114739 A1 | 5/2005 | Gupta et al. |
| 2007/0214394 A1 | 9/2007 | Gross et al. |
| 2007/0276766 A1 | 11/2007 | Hoyos et al. |
| 2007/0288365 A1 | 12/2007 | Hoyos et al. |
| 2008/0019316 A1 | 1/2008 | Imai |
| 2008/0168314 A1 | 7/2008 | Narayan |
| 2009/0067334 A1 | 3/2009 | Archer et al. |
| 2010/0199128 A1 | 8/2010 | Coppinger et al. |
| 2012/0072765 A1* | 3/2012 | Bower, III .......... G06F 11/1666 714/3 |
| 2015/0100816 A1* | 4/2015 | Alshinnawi .......... G06F 11/004 714/3 |
| 2015/0293819 A1* | 10/2015 | Havemose .......... G06F 11/1482 714/19 |

OTHER PUBLICATIONS

Chakravorty et al., "Proactive Fault Tolerance in MPI Applications via Task Migration," In Proceedings of HIPC 2006, LNCS, 2006, Springer-Verlag Berlin Heidelbert, pp. 485-496.

* cited by examiner

METHODS, APPARATUS AND SYSTEM FOR SELECTIVE DUPLICATION OF SUBTASKS

CROSS-REFERENCE TO RELATED APPLICATIONS

The present application is a continuation of U.S. patent application Ser. No. 14/176,083, filed Feb. 8, 2014, the entire contents of which are expressly incorporated herein by reference in its entirety for all purposes.

STATEMENT OF GOVERNMENT RIGHTS

This invention was made with Government support under Contract No. B599858 awarded by the Department of Energy. The Government has certain rights in this invention.

BACKGROUND OF THE INVENTION

The present invention relates generally to the electrical, electronic and computer arts, and, more particularly, to methods, apparatus and systems for selective duplication of subtasks.

In high-performance computing (HPC), typically two or more servers or computers are connected with high-speed interconnects in an HPC cluster. A cluster consists of several servers networked together that act like a single system, where each server in the cluster performs one or more specific tasks. Each of the individual computers or servers in the cluster may be considered a node. The nodes work together to accomplish an overall objective. As such, subtasks are executed on the nodes in parallel to accomplish the overall objective. However, a failure of any one subtask results in a failure of the entire parallel task.

BRIEF SUMMARY

Principles of the invention provide techniques for the selective duplication of subtasks. In one aspect, an exemplary method for selective duplication of subtasks in a high-performance computing system includes the steps of: monitoring a health status of one or more nodes in the high-performance computing system, where one or more subtasks of a parallel task execute on the one or more nodes; identifying one or more nodes as having a likelihood of failure which exceeds a first prescribed threshold; selectively duplicating the one or more subtasks that execute on the one or more nodes having a likelihood of failure which exceeds the first prescribed threshold; and notifying a messaging library that one or more subtasks were duplicated.

In another aspect, an exemplary apparatus is provided. The apparatus for performing selective duplication of subtasks in a high-performance computing system includes a memory and at least one processor coupled to the memory. The processor is operative: to monitor a health status of one or more nodes in the high-performance computing system, where one or more subtasks of a parallel task execute on the one or more nodes; to identify one or more nodes as having a likelihood of failure which exceeds a first prescribed threshold; to selectively duplicate the one or more subtasks that execute on the one or more nodes having a likelihood of failure which exceeds the first prescribed threshold; and to notify a messaging library that one or more subtasks were duplicated.

As used herein, "facilitating" an action includes performing the action, making the action easier, helping to carry the action out, or causing the action to be performed. Thus, by way of example only and without limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a non-transitory machine-readable storage medium with machine-usable program code for performing the method steps indicated. Furthermore, one or more embodiments of the invention or elements thereof can be implemented in the form of a system (or apparatus) including a memory, and at least one processor that is coupled to the memory and operative to perform exemplary method steps described herein. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques according to embodiments of the present invention can provide substantial beneficial technical effects. By way of example only, one or more embodiments may provide advantages including, but not limited to, enabling the building of large computer systems out of less reliable components, out of a mix of components with variation in reliability. The variation in reliability may be caused by variation in design, manufacturing, short term workload effects, long term usage, and/or other factors. Monitoring sensors, or other detection means, may be used to help identify less reliable components. By selectively duplicating tasks, systems using techniques in accordance with embodiments of the invention are more reliable than systems without such duplication and are more efficient than systems utilizing full duplication.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative embodiments of a computing system and method for selective duplication of subtasks in a parallel task for reducing the likelihood of failure of the parallel task. It is to be appreciated, however, that the invention is not limited to the specific apparatus and/or methods illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

As previously stated, in high-performance computing (HPC) applications, typically two or more servers or computers are connected with high-speed interconnects in an HPC cluster. A cluster generally consists of several servers networked together that act like a single system, where each server in the cluster performs one or more specific tasks. Each of the individual computers or servers in the cluster may be considered a node. The nodes work together to accomplish an overall objective. As such, subtasks are executed on the nodes in parallel to accomplish the overall objective. In the context of HPC, failure of a given subtask results in a failure of the entire parallel task. As a result of semiconductor process variations and in-field usage, among other factors, hardware increasingly exhibits a variable failure rate (e.g., mean time between failures (MTBF)) when executing parallel tasks in a distributed system.

Existing solutions to avoid failure of the entire parallel task, including duplicating all subtasks in the parallel task, check-pointing/rollback of all subtasks, etc., are costly and result in reduced performance and efficiency, among other disadvantages. For example, fully duplicating all of the subtasks in a given parallel task results in at least twice the costs in node hardware, energy (i.e., power consumption) and networks. Likewise, in system-wide check-pointing/rollback of all of subtasks in a parallel task, upon failure of a subtask, all of the subtasks are restored or rolled back to the most recent consistent set of checkpoints, which significantly increases the time for performing the parallel task.

Figure 1A:
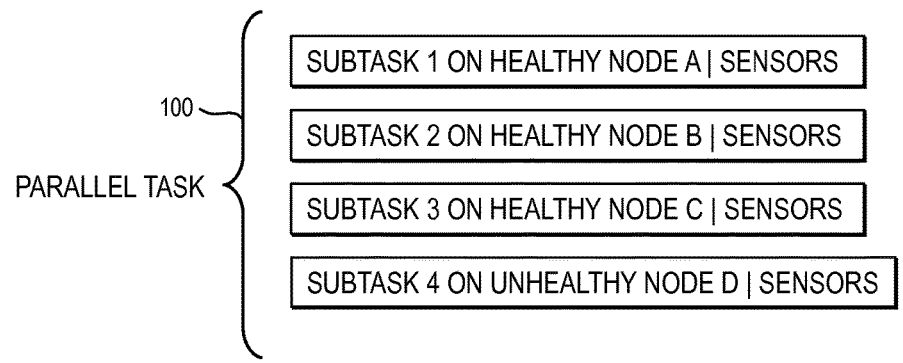
FIG. 1A is a block diagram conceptually depicting an illustrative system for executing a task in a parallel manner which can be modified to implement aspects according to one or more embodiments of the invention.

FIG. 1A is a block diagram conceptually depicting an illustrative system for executing a parallel task 100 which can be modified to implement aspects according to one or more embodiments of the invention. With reference to FIG. 1A, a parallel task 100 includes four subtasks, 1, 2, 3 and 4, each operating on one of nodes A, B, C and D, respectively, in the system. Subtasks 1 through 3 are operating on healthy nodes A through C, respectively, as may be determined by corresponding sensors or an alternative reliability health monitor. Subtask 4 is operating on an unhealthy node D. A given node is considered "unhealthy" or likely to fail if it is identified as being less reliable, as compared to a healthy node, or otherwise having a likelihood of failure which exceeds a prescribed threshold, as determined by reliability health monitors or other detection means. Conversely, a given node is considered "healthy" if it has a likelihood of failure which is at or below the prescribed threshold. The prescribed threshold may be defined as, for example, an acceptable failure/error rate.

If node D fails, subtask 4 running on node D will not be able to complete its operation(s), and thus the entire parallel task 100 will abort. Additionally, if system-wide rollback is required, any work already completed by subtasks 1, 2 and 3 on nodes A, B and C, respectively, will have to be rolled back. Further, even if subtask 4 can be locally rolled back without having work on nodes A, B or C rolled back, its fall or rollback progress will eventually become a bottleneck, at least in terms of execution time, for the overall parallel task 100. As such, this approach is costly in terms of performance penalties.

In order to overcome some of the noted shortcomings of conventional failure recovery and/or failure avoidance approaches, one or more embodiments of the invention provide techniques that enable fast recovery from node failure in a parallel task through proactive selective duplication of one or more subtasks (e.g., message passing interface (MPI) processes or threads; i.e., implementation of subtasks) that execute on hardware with possible near-term failure. More particularly, embodiments of the invention provide a system, method and/or apparatus that, to prevent failure of the entire task, provides for the selective duplication of one or more subtasks that are determined to be more likely to fail. Dynamic subtasks with input and context are selectively and dynamically duplicated to specifically provide resilience against possible failure. As previously stated, a subtask is identified as unhealthy or likely to fail if it runs on a hardware node that is deemed less reliable by reliability health monitors. A subtask that is running on a node determined to be unhealthy (i.e., likely to fail) is then duplicated on another hardware node, which itself may be healthy or unhealthy, as described further below. Upon failure of a subtask, the duplicate subtask continues its functionality in completing the parallel task with which it is associated, and thus a failure of the entire parallel task is prevented.

Figure 1B:
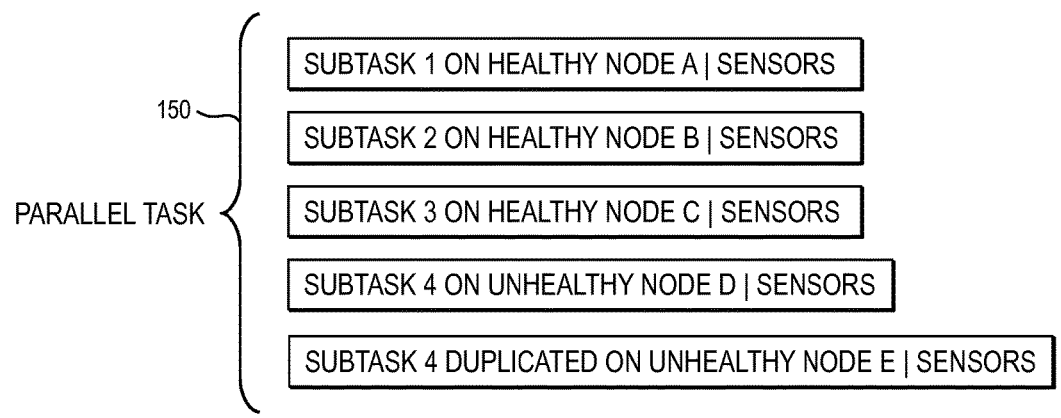
FIG. 1B is a block diagram conceptually depicting an illustrative system for executing a task in a parallel manner, according to an embodiment of the invention.

FIG. 1B is a block diagram conceptually depicting an illustrative system for executing a parallel task, according to an embodiment of the invention. For example, with respect to FIG. 1B, a parallel task 150 includes four subtasks (1, 2, 3, 4), each operating on one of nodes A, B, C and D, respectively. Subtask 4 is operating on an unhealthy node D. In one or more embodiments of the invention, subtask 4 is then duplicated on unhealthy node E. As such, the parallel task 150 can continue to execute if one of node D and node E fails, and system wide rollback is not needed. By proactively selectively duplicating subtasks, one or more embodiments of the invention provide an efficient way to prevent failure of the entire task. One or more embodiments of the invention provide for local rollback to enable further performance scalability of parallel systems.

In one or more embodiments of the invention, a messaging library is notified of the duplicated sub tasks. In some embodiments, the messaging library ensures that only one duplicated task is sending messages to other subtasks, but all of the duplicate tasks are receiving messages from other subtasks. Having only one duplicated task sending messages avoids the confusion that would exist if the subtasks had to "listen to" and act on messages from multiple duplicated tasks.

Figure 2:
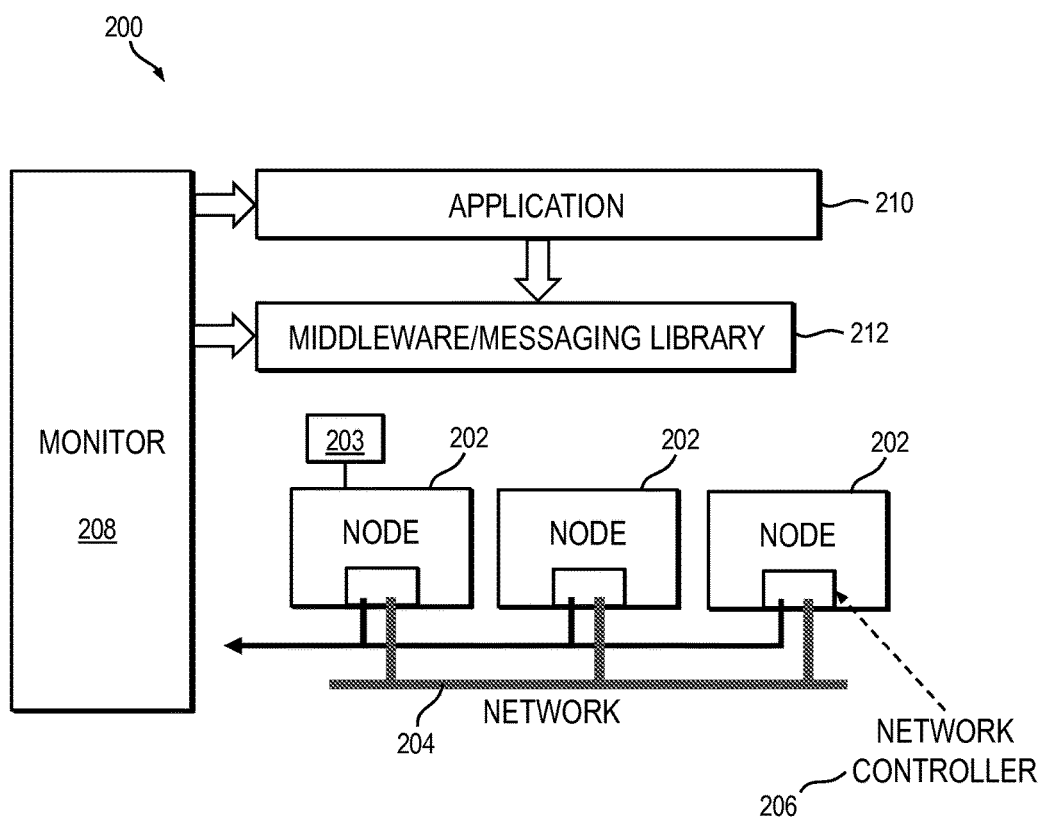
FIG. 2 is a block diagram depicting at least a portion of an exemplary system for reducing the likelihood of a parallel task failure, according to an embodiment of the invention.

With reference now to FIG. 2, at least a portion of an exemplary HPC system 200 is depicted according to according to one or more embodiments of the invention. In some embodiments, the system 200 includes one or more nodes 202 interconnected via a network 204. In some embodiments, one or more network controllers 206 operate to control the operation of each node 202 with respect to the network 204. As described above, a node 202 is an individual server or computer in a cluster of servers or computers that make up an HPC cluster. In one or more embodiments, components 203 (e.g., sensors) of each of the nodes provide sensor information which indicates memory, processing elements and surrounding conditions, such as correctable error information, temperature, voltage, circuit timing, circuit self-test results, and failure history. Exemplary components 203 may include, but are not limited to, monitors, thermal sensors, critical path monitors (CPM), negatively-biased temperature instability (NBTI) sensors, etc. The sensors may reside externally to the node 202 or at least a portion of the sensors may be incorporated into the node (i.e., residing internally).

One or more embodiments of the system 200 include a monitor 208. In some embodiments, the monitor 208 receives sensor information from the nodes 202 and determines which node is unhealthy, and sends notification of the unhealthy state of the node 202 to an application 210. Based on the notifications, the application 210 duplicates the unhealthy subtasks on additional nodes, in one or more embodiments. One or more duplicates are created. As used herein, an unhealthy subtask is a subtask functioning on an unhealthy node. The system 200 further includes middleware/messaging library 212. As is well known in the art, a message library is a compilation of pre-built message structures for executing processes (e.g., tasks and functions) that exchange data to complete a computation. In some embodiments, the monitor 208 sends a raw digitized reading of the monitor to the middleware 212 for aggregation, processing and/or summary. In one or more embodiments, the application 210 notifies the middleware 212 of the duplicated subtasks. The middleware 212 then ensures that only one duplicated subtask sends out messages to the other subtasks, and all of the duplicated subtasks receive messages. In some embodiments, the middleware 212 designates one subtask to be a primary subtask and the other subtask to be the secondary subtask. In one or more embodiments, the primary subtask is allowed to send messages, while the secondary subtask is not allowed to send messages; the secondary subtask only receives messages and updates its state.

Figure 3:
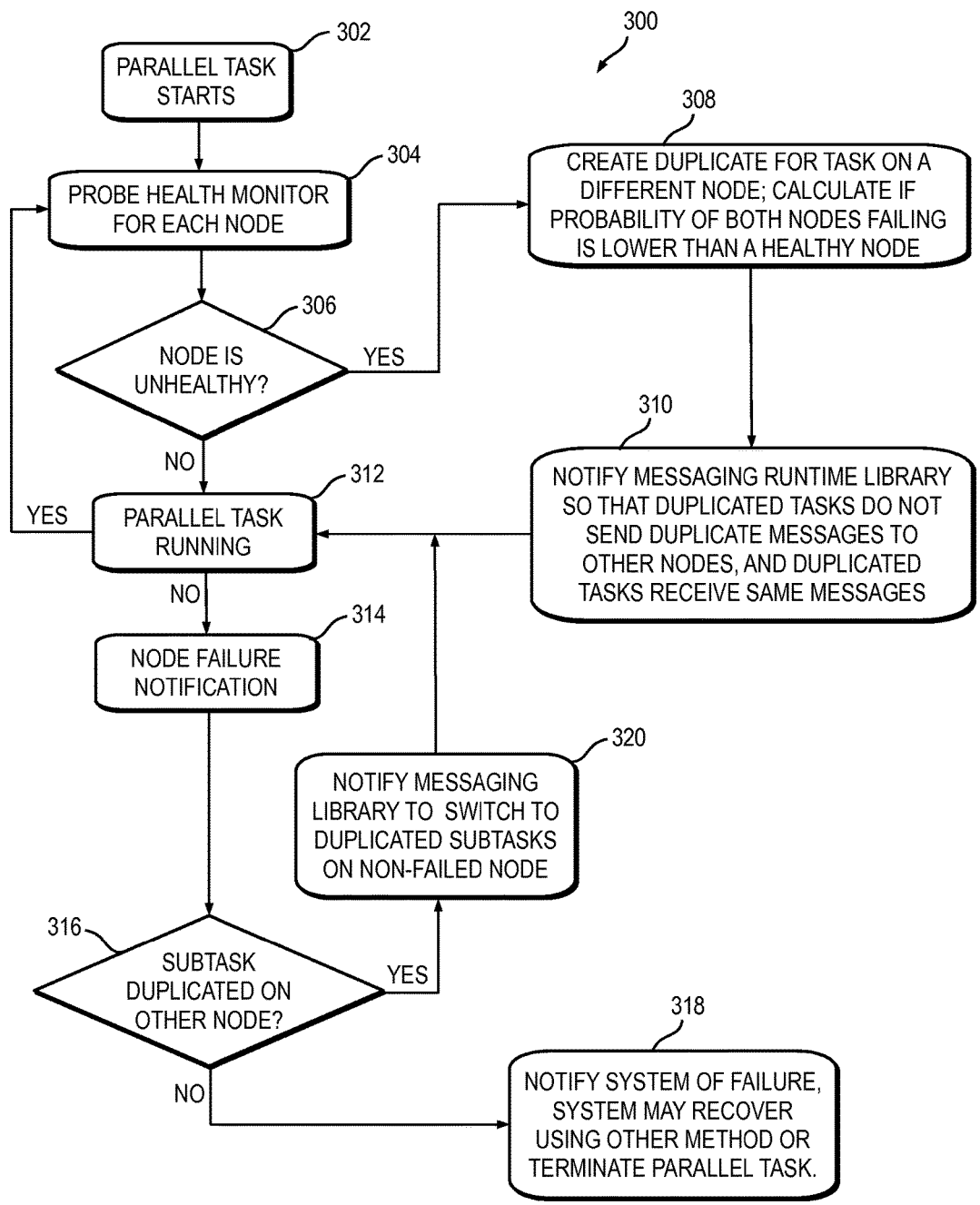
FIG. 3 is a flow chart depicting at least a portion of an exemplary methodology performed by the illustrative system shown in FIG. 2, according to an embodiment of the invention.

FIG. 3 is a flow diagram depicting at least a portion of an exemplary method 300 to enable fast recovery from node failure in a parallel task, through proactive selective duplication of subtasks that execute on hardware with possible near-term failure, according to an embodiment of the invention. With reference now to FIG. 3, in step 302, a parallel task is initiated. In one or more embodiments, a parallel task is a task that is divided into a plurality of smaller tasks, or subtasks, which are executed concurrently on several nodes. Each of the subtasks that make up the parallel task is executed on a separate node. In one or more embodiments, multiple subtasks execute on the same node, similar to executing multiple MPI tasks on a shared memory node. During execution, the health of each node is monitored. In some embodiments, the health of a node is a function of one or more factors, including, for example, hardware quality, workload behavior and ambient conditions. Thus, a node identified as "unhealthy" in one run may be identified as "healthy" in another. For example, during execution, the one or more sensors 203 coupled to the node 202 collect data concerning one or more conditions of the node 202, and send the data to the monitor 208 (FIG. 2). In one or more embodiments, the data may be obtained in real-time. Conditions surrounding the node and health indicators are accessed or polled, via the sensors, at prescribed times and/or during prescribed time intervals.

In one or more embodiments, the monitor 208 also stores a health history for each node, wherein the term "health history" as used herein refers broadly to a healthy indicated time trace. Then in step 304, a health monitor, such as monitor 208 (FIG. 2), for each node 202 is probed. During probing, a signal to request reading is sent to the health monitor, and a reading is sent back as a reply. The most common implementation of probing is as a special-purpose register (SPR) read. In step 306 a determination is made as to whether the node is unhealthy. An unhealthy node is one with the possibility of near-term hardware failures. The determination or identification of an unhealthy node is made through data collected from run-time sensors and/or health history, and, in some embodiments, on the calculation of a failure probability. In some embodiments, the node is considered unhealthy if the failure probability crosses a failure probability threshold. In other words, a node or subtask is identified as unhealthy or likely to fail if it runs on a hardware node that is deemed less reliable by reliability health monitors (e.g., monitor 208).

The sensors enable monitoring of processing node components and prediction of failure rate, which may be a reciprocal of the MTBF (i.e., MTBF=1/[failure rate]), of the node accurately with accounting for variation. If the predicted failure rate crosses a predefined threshold, the node is identified as unhealthy. In some embodiments, a healthy node is one in which the predicted failure rate of the node is lower than a predetermined or prescribed failure probability threshold conditioned on the program requirement for rollback time, checkpoint interval and total execution time. If in step 306 the node 202 is identified as unhealthy, the method proceeds to step 308, and a duplicate of the subtask is created on a different node. In one or more embodiments, the subtask is intentionally duplicated in parallel with the currently executing subtask to enable faster recovery time. By identifying unhealthy but still usable nodes, the subtasks on the unhealthy node are selectively duplicated. A benefit of this scenario is that because only subtasks on unhealthy nodes are duplicated, it is more efficient than full duplication of the node without health monitoring. A duplicated subtask, in some embodiments, may be created on a healthy node or on another unhealthy node. In some embodiments, nodes are selected for duplicated subtasks such that, mathematically, an aggregate failure rate of the original unhealthy node and the node selected for the duplicate subtask is equal to or lower than the failure rate of a healthy node. In one or more embodiments, the probability of both unhealthy nodes failing is lower than the probability of a healthy node failing. After the subtask is duplicated, in step 310 the messaging runtime library 212 is notified that the subtask has been duplicated. The messaging library 212 is notified to implement proper synchronization so that only one duplicate subtask is sending messages to the other nodes, but all of the duplicate subtasks are receiving the same messages.

If in step 306 the node 202 is identified as healthy, the method 300 proceeds to step 312, and a determination is made as to whether one or more parallel subtasks are running. If the one or more parallel subtasks are running, the method returns to step 304, and the health monitor is probed for each node. If it is determined in step 312 that one or more parallel subtasks are not running, and a failure notification of a node is issued in step 314, the method proceeds to step 316 and a determination is made as to whether the subtask is duplicated on another node. If the subtask is not duplicated on another node, the method proceeds to step 318, and the system is notified of the failure. In one or more embodiments, the system recovers using other methods or terminates the parallel subtask. If it is determined in step 316 that the subtask is duplicated on another node, the message library 212 is notified in step 320 to switch to the duplicated subtasks on the non-failed nodes and continues execution. Upon failure of a subtask, the duplicate subtask continues its functionality and thus the failure of the entire parallel task is prevented. When a node fails, its duplicate subtask can seamlessly replace the role of the failed node, thus avoiding latency due to lost work and rollback time penalties. The method then returns to steps 310 and 312.

Given the discussion thus far, it will be appreciated that, in general terms, an exemplary method, according to an aspect of the invention, includes the steps of: monitoring a health status of one or more nodes in a high-performance computing system, where one or more subtasks of a parallel task execute on the one or more nodes; identifying one or more nodes as having a likelihood of failure which exceeds a first prescribed threshold; selectively duplicating the one or more subtasks that execute on the one or more nodes having a likelihood of failure which exceeds the first prescribed threshold; and notifying a messaging library that one or more subtasks were duplicated.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
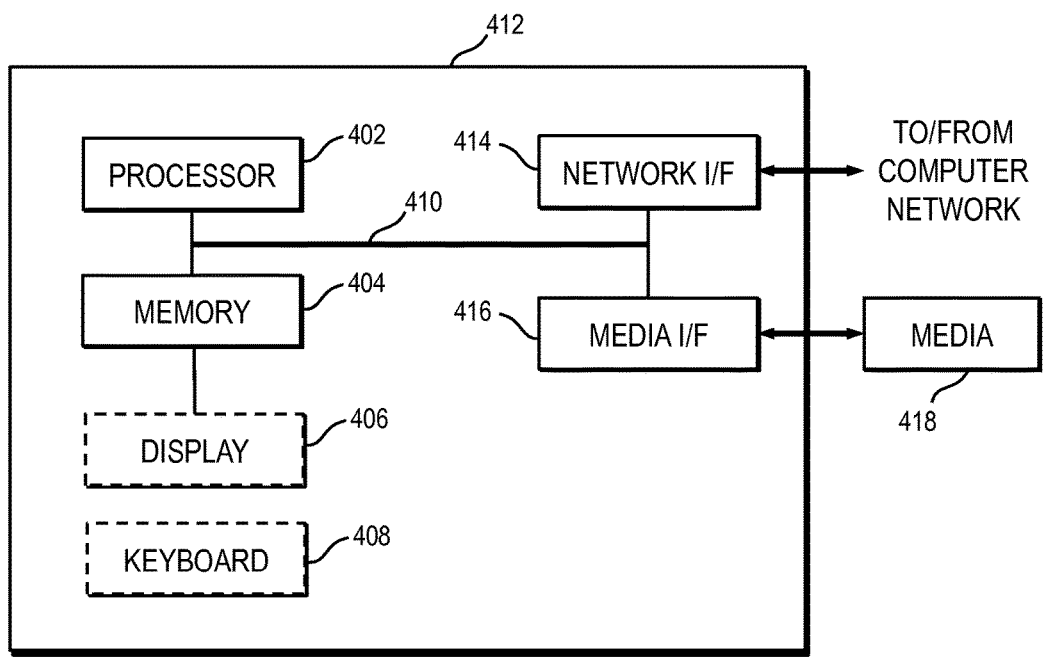
FIG. 4 is a block diagram depicting at least a portion of an exemplary computer system that may be useful in implementing one or more embodiments and/or elements of the invention.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a memory health tracking module, and a duplication module. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuits (ASICs), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for selective duplication of subtasks in a high-performance computing system, the method comprising:
   monitoring a health status of one or more nodes in a high-performance computing system, where one or more subtasks of a parallel task execute on the one or more nodes;
   identifying one or more nodes as having a likelihood of failure which exceeds a first prescribed threshold;
   selectively duplicating the one or more subtasks that execute on the one or more nodes having a likelihood of failure which exceeds the first prescribed threshold; and
   notifying a messaging library that one or more subtasks were duplicated;
   wherein the duplicated one or more subtasks is created on a different node than a node identified as having a likelihood of failure which exceeds the first prescribed threshold, and wherein the different node is also identified as having a likelihood of failure which exceeds the first prescribed threshold.

2. The method of claim 1, wherein identifying one or more nodes as having a likelihood of failure which exceeds the first prescribed threshold further comprises:
   determining a predicted failure rate for the one or more nodes; and
   determining if the predicted failure rate is higher than the first prescribed threshold.

3. The method of claim 1, wherein the health status of a node is a function of at least one of hardware quality, workload behavior and ambient conditions.

4. The method of claim 1, wherein identifying one or more nodes as having a likelihood of failure which exceeds the first prescribed threshold further comprises evaluating at least one of information obtained by one or more run-time sensors and a health history associated with the one or more nodes.

5. The method of claim 4, further comprising calculating a failure probability for the one or more nodes identified as having a likelihood of failure which exceeds the first prescribed threshold based on at least one of the information obtained by the one or more run-time sensors and the health history associated with the one or more nodes.

6. The method of claim 5, wherein a given node in the high-performance computing system is considered to have a high likelihood of failure when the failure probability crosses the first prescribed threshold.

7. The method of claim 1, wherein the messaging library allows only one of the subtask and the duplicated subtask to send messages.

8. The method of claim 1, wherein the messaging library allows both the subtask and the duplicated subtask to receive messages.

9. The method of claim 1, further comprising switching to the duplicated one or more subtasks for completing the parallel task when a corresponding node fails.

10. The method of claim 1, further comprising executing the one or more duplicated subtasks in parallel with the one or more subtasks functioning on the one or more nodes.

11. The method of claim 10, further comprising maintaining a functioning of the one or more duplicated subtasks when the node identified as having a likelihood of failure which exceeds the first prescribed threshold fails.

12. The method of claim 1, further comprising providing a system, wherein the system comprises distinct software modules, each of the distinct software modules being embodied on a non-transient machine-readable storage medium, and wherein the distinct software modules comprise a health tracking module and a duplication module, and wherein a health status of a node is determined, at least in part, by said health tracking module executing on at least one hardware processor, and the one or more subtasks executing on the one or more nodes having a likelihood of failure which exceeds the first prescribed threshold are duplicated by said duplication module executing on the at least one hardware processor.

13. An apparatus, comprising:
   a memory; and
   at least one processor coupled with the memory and operative: to monitor a health status of one or more nodes in a high-performance computing system, where one or more subtasks of a parallel task execute on the one or more nodes; to identify one or more nodes as having a likelihood of failure which exceeds a first prescribed threshold; to selectively duplicate the one or more subtasks that execute on the one or more nodes having a likelihood of failure which exceeds the first prescribed threshold; and to notify a messaging library that one or more subtasks were duplicated; wherein the duplicated one or more subtasks is created on a different node than a node identified as having a likelihood of failure which exceeds the first prescribed threshold, and wherein the different node is also identified as having a likelihood of failure which exceeds the first prescribed threshold.

14. The apparatus of claim 13, further comprising at least one run-time sensor adapted to obtain information regarding a health status of one or more nodes in the high-performance computing system, wherein the at least one processor is operative to utilize the information obtained by the at least one run-time sensor in monitoring the health status of the one or more nodes.

15. The apparatus of claim 13, wherein the at least one processor is further operative to calculate a predicted failure rate for the one or more nodes in the high-performance computing system.

16. The apparatus of claim 13, further comprising a plurality of distinct software modules, each of the software modules being embodied on a computer-readable storage medium, the distinct software modules comprising a memory health tracking module and a duplication module, wherein the at least one processor is operative: to determine a health status of at least one of the nodes by executing the memory health tracking module; and to duplicate one or more subtasks executing on the node by executing the duplication module.

17. The apparatus of claim 13, wherein the duplicated one or more subtasks is created on a different node than a node identified as having a likelihood of failure which exceeds the first prescribed threshold, and wherein the different node is also identified as having a likelihood of failure which exceeds the first prescribed threshold.

* * * * *